United States Patent
Liang

(10) Patent No.: US 11,811,999 B2
(45) Date of Patent: Nov. 7, 2023

(54) FACSIMILE DOCUMENT MANAGEMENT SYSTEM USING POLICIES

(71) Applicant: KYOCERA DOCUMENT SOLUTIONS INC., Osaka (JP)

(72) Inventor: Jin Liang, Dublin, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 17/713,414

(22) Filed: Apr. 5, 2022

(65) Prior Publication Data
US 2023/0319213 A1    Oct. 5, 2023

(51) Int. Cl.
*H04N 1/32* (2006.01)
*H04N 1/00* (2006.01)

(52) U.S. Cl.
CPC ..... *H04N 1/32411* (2013.01); *H04N 1/00212* (2013.01); *H04N 1/32016* (2013.01); *H04N 1/32128* (2013.01); *H04N 2201/0094* (2013.01); *H04N 2201/3216* (2013.01)

(58) Field of Classification Search
CPC ........... H04N 1/00206; H04N 1/00209; H04N 1/00212; H04N 1/00214; H04N 1/32016; H04N 1/32101; H04N 1/32128; H04N 2201/3226; H04N 1/32406; H04N 1/32411; H04N 2201/0094
USPC .......................................................... 358/402
See application file for complete search history.

(56) References Cited

U.S. PATENT DOCUMENTS

| | | | |
|---|---|---|---|
| 6,831,758 B1* | 12/2004 | Toda | H04N 1/32769 358/440 |
| 2008/0301234 A1* | 12/2008 | Tonegawa | H04L 51/066 709/206 |
| 2014/0093170 A1* | 4/2014 | Ohguro | G06V 30/416 382/176 |
| 2022/0150367 A1* | 5/2022 | Kasuya | H04N 1/00411 |

* cited by examiner

*Primary Examiner* — Kent Yip
(74) *Attorney, Agent, or Firm* — MILLEN, WHITE, ZELANO & BRANIGAN, P.C.; William Nixon

(57) ABSTRACT

A document management system includes a facsimile device or a multi-peripheral (MFP) device having facsimile and scanning components. A cloud based server stores a policy that is used to manage documents received at the facsimile device or scanning component. When a document is received at the facsimile device or scanning component, a parameter is used to determine an action to be taken according to the policy. Such actions include forwarding the received document to the cloud based server or sending it as an attachment in an email. When received at the cloud based server, the policy is used to categorize the document according to an attribute to make the document available within a document management service.

17 Claims, 9 Drawing Sheets

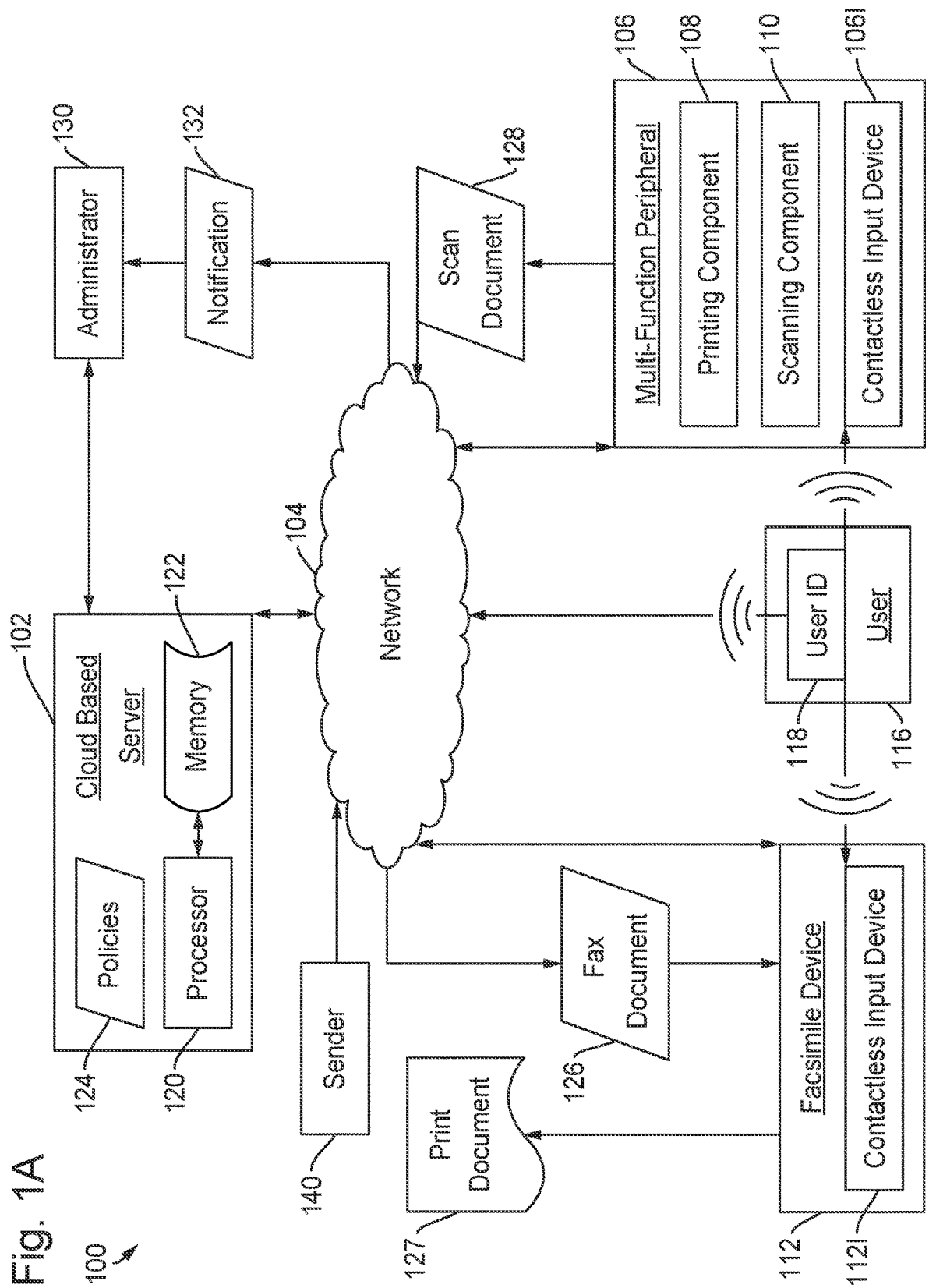

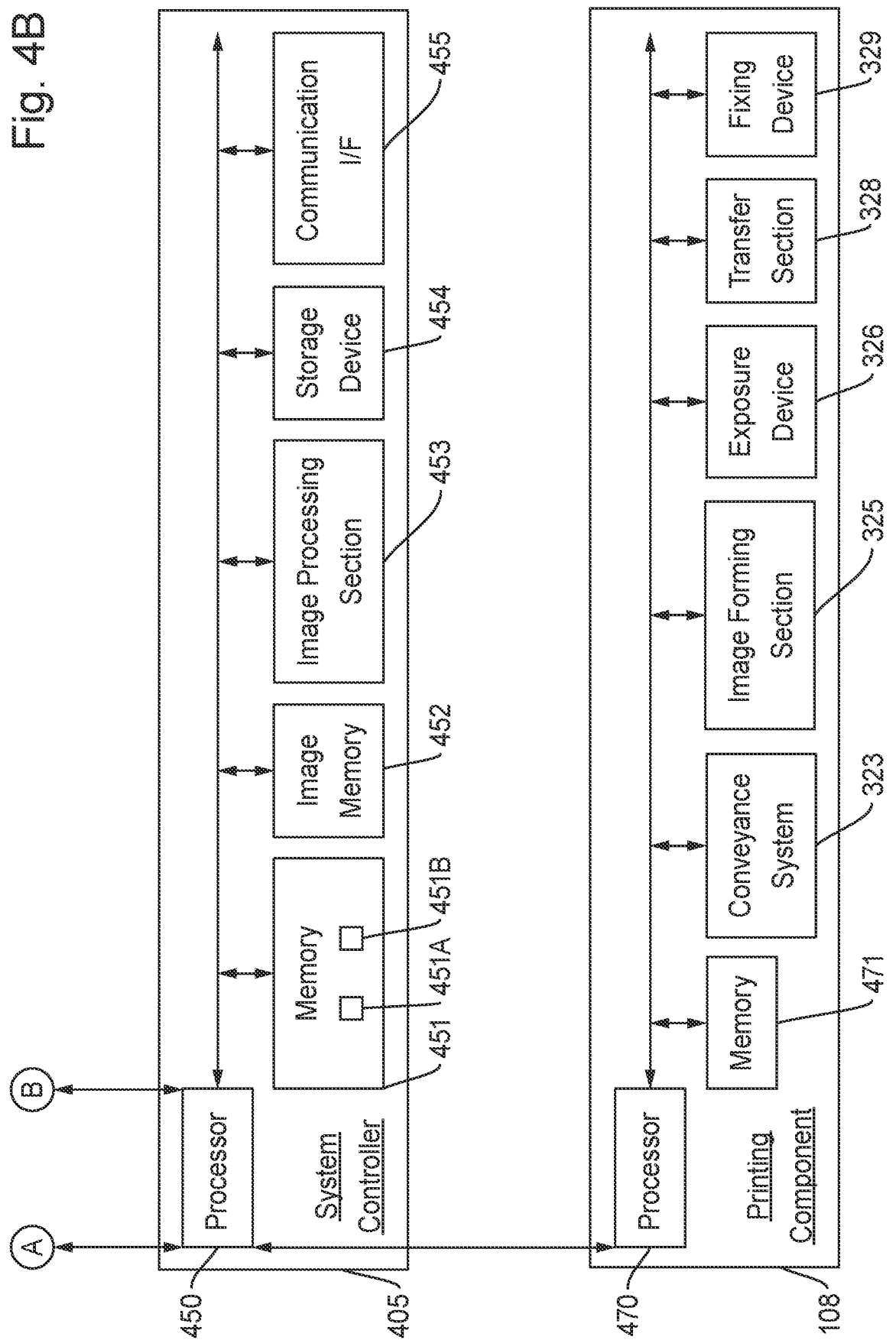

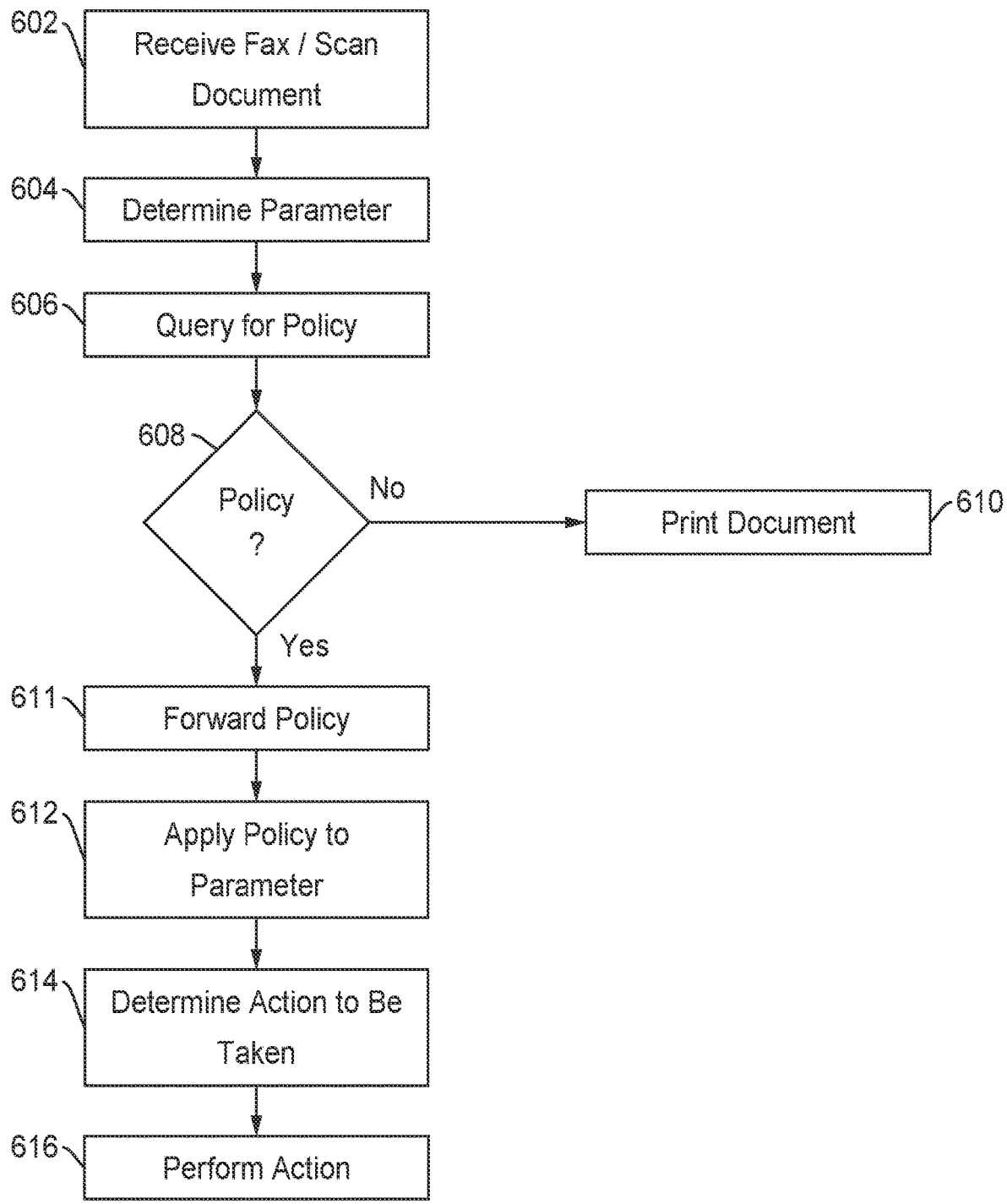

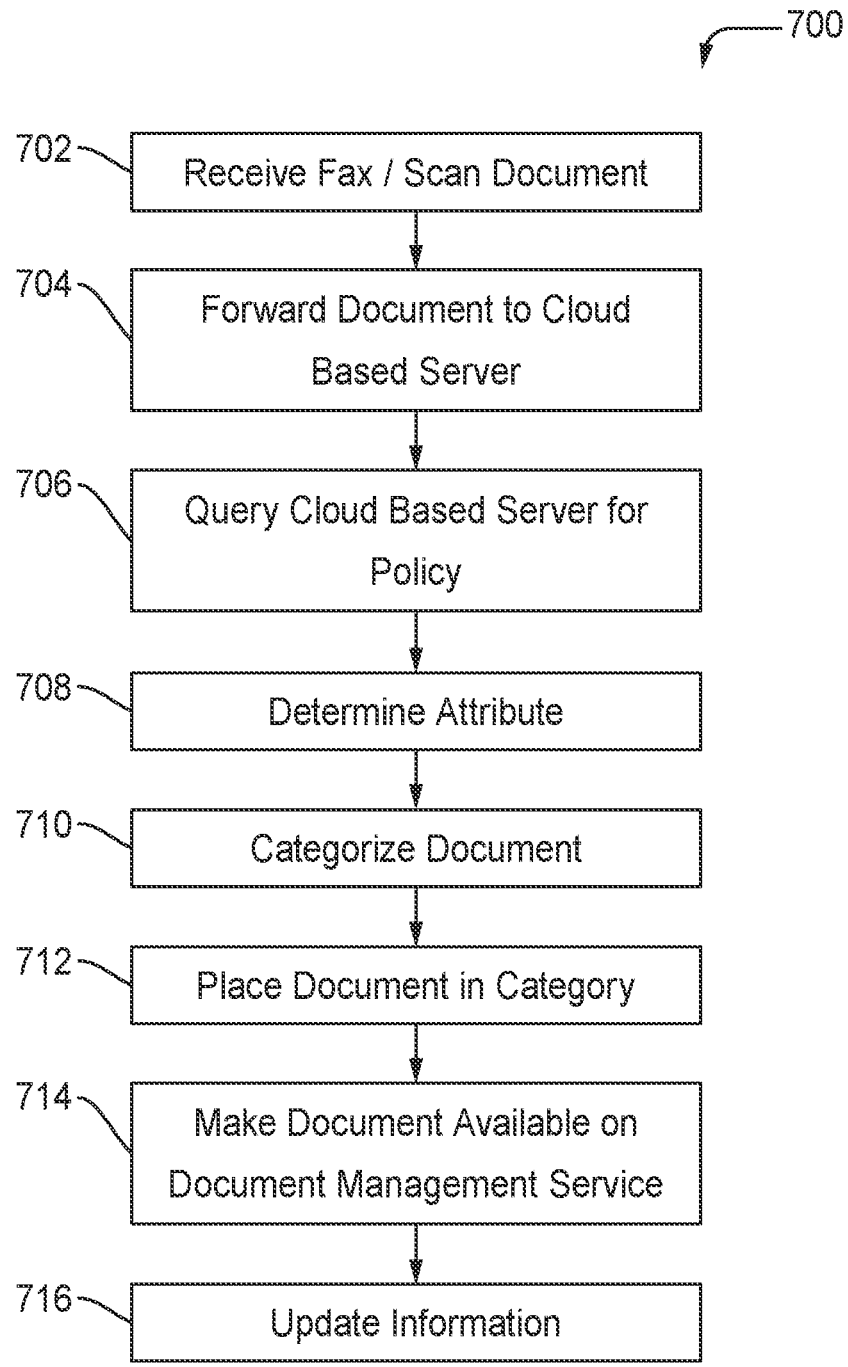

FACSIMILE DOCUMENT MANAGEMENT SYSTEM USING POLICIES

FIELD OF THE INVENTION

The present invention relates to a document processing system receives facsimile and scanned documents. More specifically, the present invention relates to managing received facsimile and scanned documents using policies.

DESCRIPTION OF THE RELATED ART

Current facsimile systems can receive facsimile ("fax") documents by printing the documents at the facsimile machine, or multi-functional peripheral ("MFP"). Some MFPs may be configured to forward fax documents to email. Yet, issues may arise when managing fax documents be either paper print outs or attachments in email.

SUMMARY OF THE INVENTION

A method for managing facsimile documents is disclosed. The method includes receiving a facsimile document from a sender at a multi-functional peripheral (MFP) device. The facsimile document includes an attribute. The method also includes querying a cloud based server of a document management service for a policy related to the sender of the facsimile document. The method includes categorizing the facsimile document according to the policy to match at least one category within the document management service. The method also includes posting the facsimile document to the matched at least one category within the document management service.

A method for managing scanned documents is disclosed. The method includes scanning a scanned document for an operator at a multi-functional peripheral (MFP) device. The scanned document includes an attribute. The method also includes querying a cloud based server of a document management service for a policy related to the operator proving the scanned document. The method also includes categorizing the scanned document according to the policy to match at least one category within the document management service. The method also includes posting the scanned document to the matched at least one category within the document management service.

A document management system is disclosed. The document management system is configured to receive a document from a sender at a multi-functional peripheral (MFP) device. The document includes an attribute. The document management system also is configured to query a cloud based server of a document management service for a policy related to the sender of the document. The document management system also is configured to categorize the document according to the policy to match at least one category within the document management service. The document management system also is configured to post the document to the matched at least one category within the document management service.

A method for managing facsimile documents is disclosed. The method includes receiving a facsimile document from a sender at a multi-functional peripheral (MFP) device. The facsimile document includes a parameter. The method also includes querying a cloud based server of a document management service for a policy related to the sender of the facsimile document. The method also includes determining whether an action is to be taken by the MFP device based on the parameter of the facsimile document and the policy. The method also includes performing the action at the MFP device to forward the facsimile document within the document management service.

A document management system is disclosed. The document management system is configured to receive a facsimile document from a sender at a multi-functional peripheral (MFP) device. The facsimile document includes a parameter. The document management system also is configured to query a cloud based server of a document management service for a policy related to the sender of the facsimile document. The document management system also is configured to determine whether an action is to be taken by the MFP device based on the parameter of the facsimile document and the policy. The document management system also is configured to perform the action at the MFP device to forward the facsimile document within the document management service.

A non-transitory computer-readable medium having stored thereon processor-executable instructions for managing facsimile documents is disclosed. The instructions include receiving a facsimile document from a sender at a multi-functional peripheral (MFP) device. The facsimile document includes a parameter. The instructions also include querying a cloud based server of a document management service for a policy related to the sender of the facsimile document. The instructions also include determining whether an action is to be taken by the MFP device based on the parameter of the facsimile document and the policy. The instructions also include performing the action of the MFP device to forward the facsimile document within the document management service.

BRIEF DESCRIPTION OF THE DRAWINGS

Various other features and attendant advantages of the present invention will be more fully appreciated when considered in conjunction with the accompanying drawings.

FIG. 1A illustrates a document processing system to implement policies for printing and scanning operations according to the disclosed embodiments.

FIG. 4B further illustrates the block diagram of an example control system for the MFP according to the disclosed embodiments.

FIG. 6 illustrates a flowchart for managing a fax document or a scan document using a received policy or a defined policy at a facsimile device or a scanning component, respectively, according to the disclosed embodiments.

FIG. 7 illustrates a flowchart for managing a fax document or a scan document using a defined policy to categorize the document according to the disclosed embodiments.

DETAILED DESCRIPTION OF THE PREFERRED EMBODIMENTS

Figure 1B:
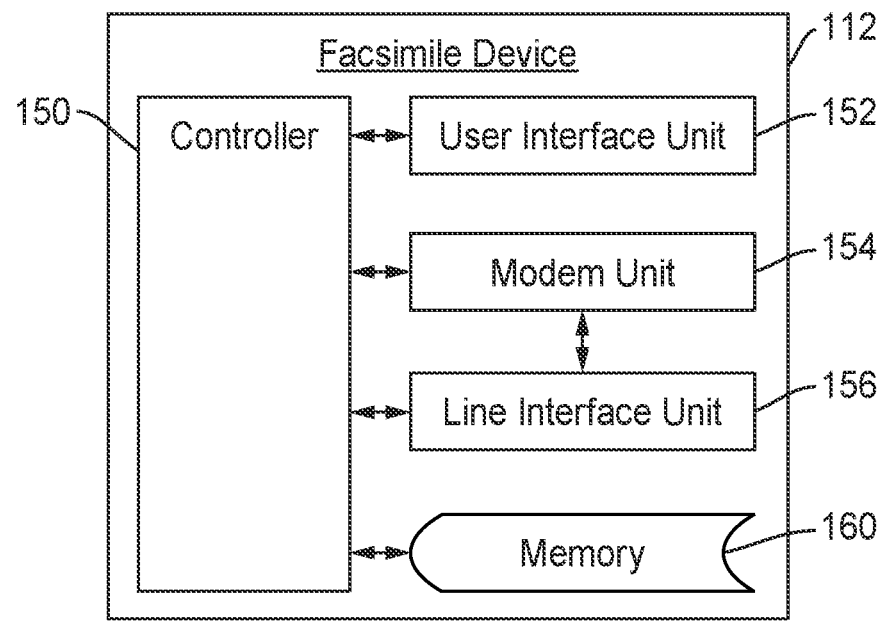
FIG. 1B illustrates a block diagram of the facsimile device according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide a solution that allows the forwarding of received fax documents. It also categorizes the fax documents in a document management service based on configured policies. This feature better manages the fax documents and improves productivity. In some embodiments, the fax documents are received at an MFP device, automatically forwarded, and categorized based on the configured policies.

For example, a fax document forwarding policy may forward the received document based on a parameter within the fax document. The parameter may be related to the sender of the document, such as a phone number, identification number, and the like. Alternatively, the parameter may be a document size. The disclosed embodiments analyze the parameter then decide how to treat the document within the document management service.

In some embodiments, a user or an administrator pre-configures the forwarding policies in the cloud based document management service, preferably at a cloud based server. The MFP device receives the fax document from a sender. The MFP device calls the cloud based server to check if the fax document should be sent to the cloud based server. Alternatively, the fax document may be attached to an email. If no forwarding policy is matched at the cloud based server, or if the policy indicates the MFP device should print the fax document, then the MFP device prints the fax document. If the cloud based server matches the fax document to a forwarding policy, then the MFP device send the fax document to the cloud based server. The cloud based server continues the process of forwarding and categorizing.

A categorizing policy also may be implemented. The categorizing policy also is stored at the cloud based server. The user or the administrator may pre-configure the categorizing policy on the cloud based server. After the cloud based server receives the fax document from the MFP device, it determines applicable categories based on the attributes of the fax document. The cloud based server posts the fax document to the matching one or more categories on the document management service.

The disclosed embodiments, therefore, allow users to automatically receive important fax documents on the document management service. The disclosed embodiments also filter out possible spams. The disclosed embodiments also easily manage the fax document on the document management service, which improves productivity and availability of the fax document within the service. Users can manage the fax documents in the different categories on the document management service.

FIG. 1A depicts a document management system 100 to implement policies for managing documents, including fax documents, according to the disclosed embodiments. Document management system 100 implements a document management service. The document management service allows users and administrators to manage the printing, scanning, sending, and use of documents within system 100.

As disclosed below, document management service may refer to document management system 100 and the functionality provided thereon.

Document management system 100 includes cloud based server 102, which may manage operations within the system using policies 124. Policies 124 may be disclosed in greater detail below. Cloud based server 102 also includes a processor 120 and a memory 122. Memory 122 may store instructions that, when executed by processor 120, configure cloud based server 102 to perform certain functions. Cloud based server 102 also may provide instructions to other components within system 100 as defined by policies 124.

System 100 also may include multi-functional peripheral (MFP) 106. MFP 106 is disclosed in greater detail below by FIGS. 2-4B. MFP 106 may include printing component 108 and scanning component 110. These components may perform printing operations and scanning operations. Cloud based server 102 may communicate with MFP 106 via network 104.

System 100 also may include facsimile device 112. In some embodiments, facsimile device 112 also is located in MFP 106 along with printing component 108 and scanning component 110. FIG. 1 shows facsimile device 112 as a separate device as the disclosed embodiments also relate to receiving and managing fax documents within system 100. Facsimile device 112 may be a terminal for performing data communications by using network 104. Network 104 may include a public switched telephone network (PSTN). Facsimile device 112 transmits and receives facsimile data, such as fax document 126, by using network 104. Facsimile device 112 is disclosed in greater detail below.

MFP 106 includes contactless input device 1061. Facsimile device 112 includes contactless input device 1121. The contactless input devices may be devices that allow a reader scan a graphic provided on a card or mobile device of user 116. Alternatively, the contactless input devices may be card readers that allow user 116 to move a card having a magnetic strip or chip through the reader to provide information. The contactless input devices obtain user identification 118 from the card, graphic, barcode, magnetic strip, chip, and the like without the need for user 116 to input information directly at the applicable device.

The disclosed embodiments may use policies 124 to manage documents sent over network 104 or scanned at scanning component 110. For example, user 116 may log onto facsimile device 112 using contactless input device 1121. Contactless input device 1121 reads a QR code from a lanyard card of user 116. User identification 118 is determined from the QR code, which matches user 116. Facsimile device 112 provides user identification 118 to cloud based server 102. Cloud based server 102 looks up the user profile associated with user identification 118. The user profile may list one or more documents for printing, as indicated by user 116. User 116 may select these documents to be printed using a document management service application. Further, user 116 may view documents received at cloud based server 102.

Cloud based server may instruct scanning component 110 to determine if any documents are present at the device. One or more documents may be loaded into an automated document feeder (ADF) for scanning component 110. Alternatively, one or more documents, preferably a sheet, are placed on the platen glass for scanning component 110. Scanning component 110 may then be instructed to scan the one or more documents to generate scan document 128. Scan document 128 may be an image file of the document placed at scanning component 110. Upon user log on, scanning operations will commence if documents are loaded onto the platen glass or the ADF.

Facsimile device 112 also is included in system 100. In some embodiments, facsimile device 112 is within MFP 106 along with printing component 108 and scanning component 110. In fact, a facsimile device within MFP 106 would use some of the same features as printing component 108 and scanning component 110. FIG. 1, however, depicts facsimile device 112 as a separate device for illustrative purposes and to show that the disclosed embodiments also include a separate device that is not incorporated within MFP 106.

Facsimile device 112 receives a fax document 126 from a sender 140. Sender 140 may be another facsimile device or an MFP. Further, sender 140 may be a computer terminal sending a PDF document via email or message to facsimile device 112. Sender 140 includes a parameter, such as a telephone number, identification number, device IP address, or other identifier, that it attaches to fax document 126. The parameter identifies sender 140 to facsimile device 112 and may be used to manage fax document 126 within system 100.

Administrator 130 may act on cloud based server 102 as needed. It may modify policies 124 and update categories used according to the disclosed embodiments. Administrator 130 also may receive notification 132 when fax document 126 or scan document 128 is received and forwarded to cloud based server 102. In some embodiments, notification 132 may be sent as a warning that a problem occurred within system 100 on managing a received document. Notification 132 also may be sent when a certain number of documents are sent to cloud based server 102, or to verify receipt of a forwarded document.

Facsimile device 112 is disclosed in greater detail in FIG. 1B, which depicts a block diagram of the facsimile device according to the disclosed embodiments. Facsimile device 112 may include a user interface unit 152, a modem unit 154, a line interface unit 156, a memory 160, and a controller 150. Facsimile device 112 may further include a power unit for supplying power to the components disclosed herein.

User interface unit 152 may include an input unit for receiving an input from a user 116 to perform a function of facsimile device 112 and an output unit for providing an output to user 116, such as displaying a function execution result of facsimile device 112. For example, user interface unit 152 may include an operation panel that receives a user input, and a display panel that displays a screen image.

In more detail, the input unit may be any of components capable of receiving various types of user inputs, such as a keyboard, a physical button, a touch screen, a camera, a microphone, and the like. The output unit may be display panel, a speaker, and the like. Examples are not limited thereto, and user interface unit 152 may include a component that supports various inputs and outputs.

Modem unit 154 performs a conversion between a digital signal and an analog signal. For example, modem unit 154 converts a digital signal output by facsimile device 112 into an analog signal and transmits the analog signal to network 104. Modem unit 154 also may receive an analog signal received from network 104 and convert the received signal into a digital signal. For example, fax document 126 may be received at modem unit 154 and converted into a digital signal that forms the digital image of the document within facsimile device 112.

Line interface unit 156 connects modem unit 154 to an output to network 104, such as a telephone line. For example, line interface unit 156 connects a signal output by modem unit 154 to the telephone line and inputs a signal received from the telephone line to modem unit 154. Line interface unit 156 may include a data access arrangement (DAA) for connecting to a PSTN.

Memory 160 may install and store programs, such as applications, and various types of data, such as files. For example, memory 160 may store a program to manage fax documents received at facsimile device 112. The program may instruct facsimile device 112 to interact with cloud based server 102 to manage the received fax documents. Further, memory 160 may store one or more policies 124 from cloud based server and enable a program to apply the one or more policies to manage received fax documents 126.

Controller 150 may control an overall operation of facsimile device 112, and may include at least one processor, such as a central processing unit (CPU). Controller 150 may control the other components included in facsimile device 112 to perform an operation corresponding to a user input received via user interface unit 152. Controller 150 also may enable functions to receive fax document 126 and proceed with an action to manage the document. Controller 150 also may apply one or more policies 124 stored within memory 160. Alternatively, controller 150 may implement an action as instructed by cloud based server 102. Controller 150 also may access and use data stored in memory 160 or may store new data in memory 160.

Figure 1C:
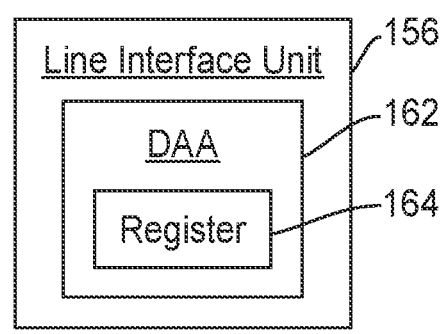
FIG. 1C illustrates a block diagram of a line interface unit according to the disclosed embodiments.

FIG. 1C is a block diagram of line interface unit 156 according to the disclosed embodiments. Line interface unit 156 connects to modem unit 154 to a line out from facsimile device 112, such as a telephone line. Line interface unit 156 may include a DAA 162 for connecting to a PSTN using the telephone line. DAA 162 may be connected to the telephone line and may sense, for example, the voltage of the telephone line and the frequency of the dial tone.

DAA 162 may include a register 164. A value stored in register 164 may be used to determine whether the interface between modem unit 154 and line interface unit 156 has been normally established. Controller 150 may determine whether the interface between modem unit 154 and line interface unit 156 has been normally established by reading a register value and determining whether the read register value is a set value.

Referring back to FIG. 1A, facsimile device 112 may take different actions upon receipt of fax document 126. These actions may be defined by a policy 124 from cloud based server 102. These features are disclosed in greater detail below. One action may be to forward fax document 126 to cloud based server 102. Based on sender 140, certain documents may be sent directly to cloud based server 102 for management operations. Another action may be sending fax document 126 to an email recipient as an email attachment. Policy 124 may define the person to receive fax document 126 via email.

Another action may be to print fax document 126 as print document 127 at facsimile device 112. Policy 124 may identify certain documents that need to be printed out instead of forwarded to cloud based server 102 or an email recipient. In some embodiments, if no policy 124 is applicable, then facsimile device 112 or MFP 106 prints print document 127.

Once received at cloud based server 102, policy 124 may serve to categorize fax document 126 within the document management service. Cloud based server 102 may categorize fax document 126 according to an attribute received with the document when provided from facsimile device 112. For example, policy 124 may instruct that fax documents be categorized by the date received at facsimile device 112. Cloud based server 102 places fax document 126 into a category for the applicable date based on an attribute, which is the date stamped on the document by facsimile device 112. More than one category may receive fax document 126.

Figure 2:
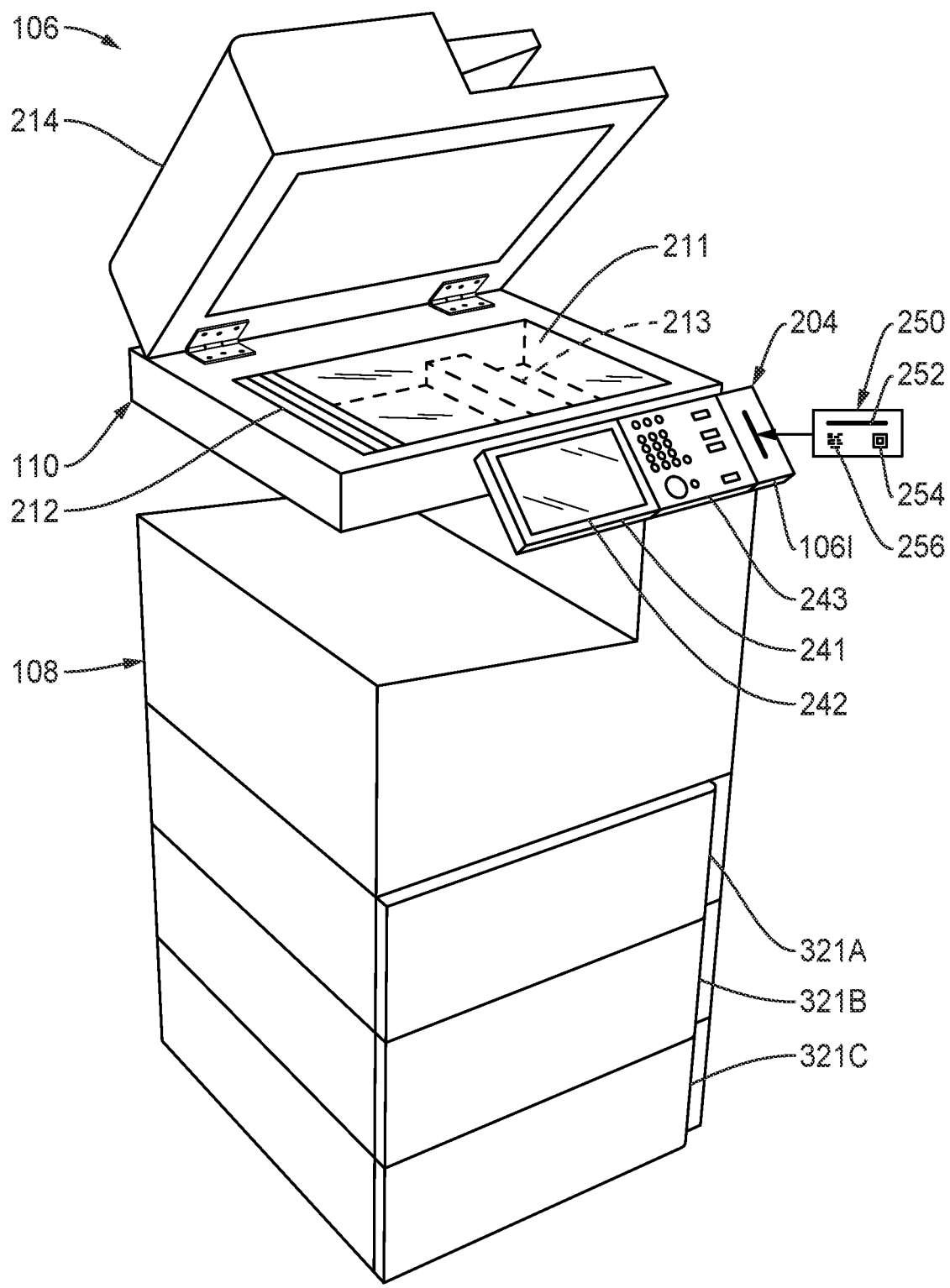
FIG. 2 illustrates a perspective view of a multi-functional peripheral (MFP) according to the disclosed embodiments.
Figure 3:
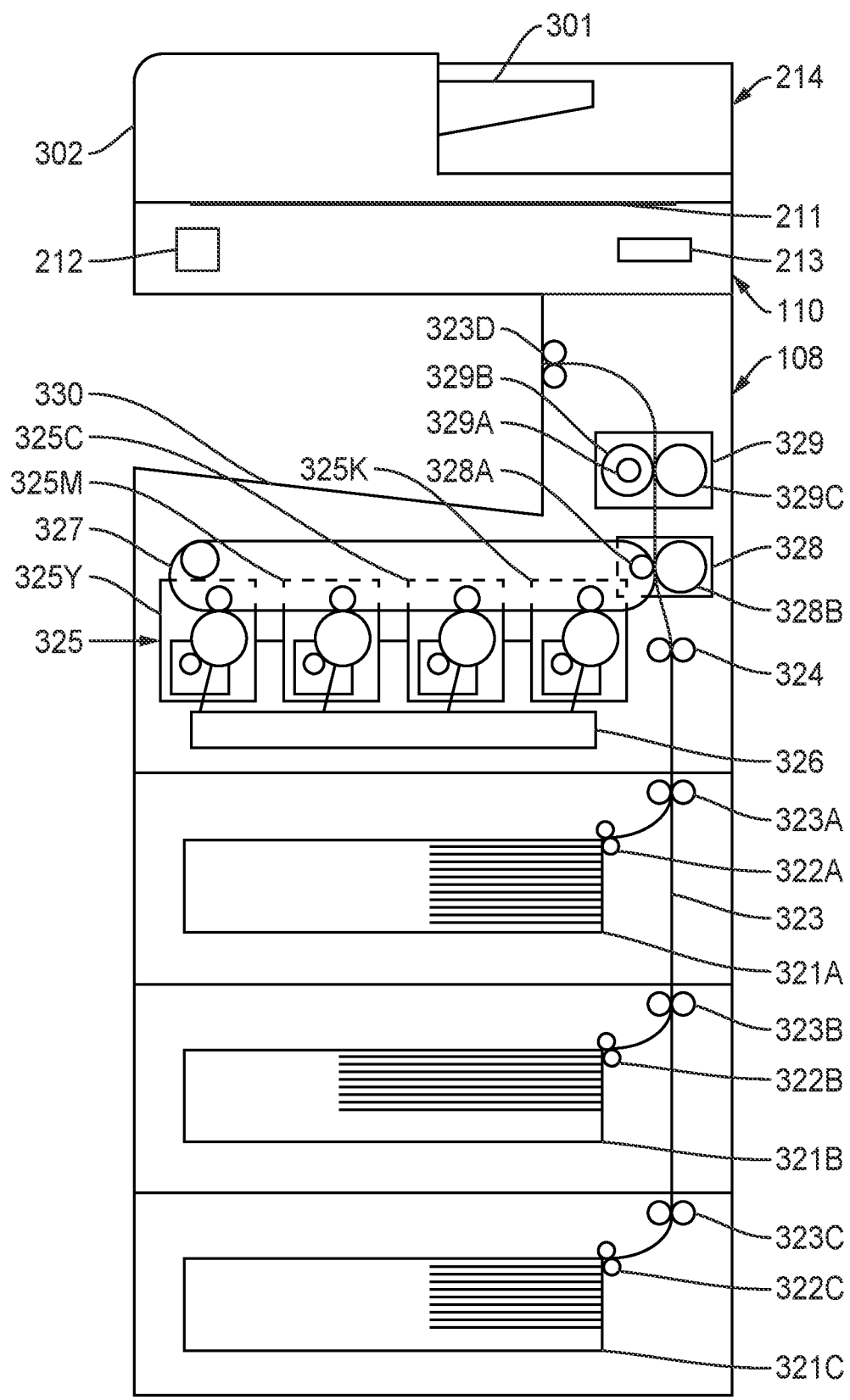
FIG. 3 illustrates a cross-sectional view of the MFP according to the disclosed embodiments.

FIG. 2 depicts a perspective view of MFP 106 as an image forming apparatus according to the disclosed embodiments. FIG. 3 depicts a cross-sectional view of MFP 106 according to the disclosed embodiments. As shown in FIG. 2, MFP 106 includes scanning component 110, printing component 108, and an operation panel 204. Scanning component 110 is provided at an upper part of a main body of MFP 106. Scanning component 110 has a document table, or platen, glass 211 on which a document to be scanned is placed. Scanning component 110 includes an image reading mechanism that scans the document on platen glass 211.

Scanning component 110 also includes a carriage 212 and a photoelectric conversion section 213. Carriage 212 and photoelectric conversion section 213 are provided below platen glass 211. Carriage 212 includes an illumination 462, as shown in FIG. 4 and an optical system such as a mirror. Illumination 462 is provided in carriage 212 to irradiate a reading position on platen glass 211 with light. The reading position on platen glass 211 irradiated by illumination 462 with the light is an image corresponding to one line, or a plurality of lines, in a main scanning direction. The optical system such as a mirror provided in carriage 212 guides a light, or reflected light, from the reading position irradiated by illumination 462 to photoelectric conversion section 213.

Carriage 212 is moved in a sub-scanning direction below platen glass 211 by a movement mechanism 463, as shown in FIG. 4, including a stepping motor or the like. A position of carriage 212 is determined in an initial operation, and the movement thereof in the sub-scanning direction is controlled based on the determined position. For example, carriage 212 is moved in the sub-scanning direction to continuously guide an image of each line in the main scanning direction in a document reading area on platen glass 211 wherein the document is placed to photoelectric conversion section 213.

Photoelectric conversion section 213 includes a lens, a photoelectric conversion sensor, and a cover. The lens condenses the light guided by the optical system of carriage 212 to guide the light to the photoelectric conversion sensor. The photoelectric conversion sensor includes photoelectric conversion elements. The photoelectric conversion sensor, for example, may be a line sensor in which charge coupled devices (CCDs) or contact image sensors (CISs) as photoelectric conversion elements are arranged in a line. The line sensor as the photoelectric conversion sensor converts the image corresponding to one line in the main scanning direction, reflected light by a document surface, into pixel data corresponding to one line.

Carriage 212 includes an exposure lamp and the optical system, such as a mirror, and is moved below platen glass 211 in the sub-scanning direction. Carriage 212 moves the reading position on platen glass 211 leading to photoelectric conversion section 213 in the sub-scanning direction. Specifically, scanning component 110 adjusts the reading of the image in the sub-scanning direction by controlling the movement of carriage 212. Scanning component 110 reads the image of the entire document be acquiring the image data in the main scanning direction converted by photoelectric conversion section 213 while moving carriage 212 in the sub-scanning direction.

Scanning component 110 also includes ADF 214. ADF 214 also functions as a document table cover and is provided in an openable manner. When ADF 214 is closed, it covers the entire document reading area on platen glass 211. ADF 214 includes a sheet feed tray 301 and a conveyance system 302, as illustrated in FIG. 3. Sheet feed tray 301 of ADF 214 holds a document of sheets to be read. Conveyance system 302 of ADF 214 picks up the sheets of the document set in sheet feed tray 301 one by one to convey them so that a reading surface of each sheet taken out passes through a predetermined reading position. Using this process, scanning component 110 may generate scan document 128.

As illustrated in FIG. 3, printing component 108 includes sheet feed cassettes 321A, 321B, and 321C. Additional feed cassettes may be loaded onto MFP 106. Each of sheet feed cassettes 321A, 321B, and 321C accommodates a sheet as an image forming medium on which an image is to be printed. For example, each of sheet feed cassettes 321A, 321B, and 321C is detachable from the lower part of MFP 106. Sheet feed cassettes 321A, 321B, and 321C have sheet feed rollers 322A, 322B, and 322C, respectively. Sheet feed rollers 322A, 322B, and 322C pick up sheets one by one from sheet feed cassettes 321A, 321B, and 321C, respectively.

Conveyance system 323 conveys a sheet in printing component 108. Conveyance system 323 includes a plurality of conveyance rollers 323a, 323b, 323c, and 323d as well as a registration roller 324. Conveyance system 323 conveys the sheet taken from sheet feed rollers 322A, 322B, or 322C to registration roller 324. Registration roller 324 conveys the sheet to a transfer position in accordance with a timing at which an image is transferred.

An image forming section 325 includes a plurality of image forming sub-sections 325Y, 325M, 325C, and 325K to form images of respective colors (yellow, magenta, cyan, and black). An exposure device 326 forms an electrostatic latent image as an image to be developed in each color on each image carrier in each of image forming sub-sections 325Y, 325M, 325C, and 325K. Exposure device 326 forms the electrostatic latent image on the image carrier by exposing the image carrier with the light emitted in response to the image data. For example, exposure device 326 exposes a photoconductive drum as the image carrier in the main scanning direction by irradiating the photoconductive drum via a rotating polygon mirror with the light emitted by a light emitting section. The irradiation position of the light from exposure device 326 moves in the sub-scanning direction as the photoconductive drum rotates. Specifically, a position and magnification of an image formed by image forming section 325 are adjusted by controlling exposure device 326.

Image forming sub-sections 325Y, 325M, 325C, and 325K develop electrostatic latent images on the respective image carriers with toners of respective colors (yellow, magenta, cyan, and black). Intermediate transfer belt 327 is an intermediate transfer member. Image forming sub-sections 325Y, 325M, 325C, and 325K transfer toner or ink images for respective colors developed with the toners or inks of respective colors on respective image carriers onto intermediate transfer belt 327, or the primary transfer.

Intermediate transfer belt 327 conveys the transferred toner or ink image to a secondary transfer position while holding the toner or ink image. The secondary transfer position is a position where the toner or ink image on intermediate transfer belt 327 is transferred onto a sheet. At the secondary transfer position, a support roller 328a and secondary transfer roller 328b face each other. Support roller 328a and secondary transfer roller 328b constitute a transfer section 328. Registration roller 324 conveys the sheet to the secondary transfer position in accordance with a timing at which the toner or ink image on intermediate transfer belt 327 is transferred. Transfer section 328 transfers the toner or ink image held on intermediate transfer belt 327 onto the sheet at the secondary transfer position.

For example, in the case of forming a color image, image forming sections 325Y, 325M, 325C, and 325K transfer toner or ink images developed with toners or inks of respective colors (yellow, magenta, cyan, and black) onto intermediate transfer belt 327 by overlapping the toner or ink images on the intermediate transfer belt. Intermediate transfer belt 327 holds a color image obtained by overlapping the toner or ink images for respective colors. Transfer section 328 transfers the color image formed with the toners or inks of plural colors on intermediate transfer belt 327 onto the sheet at the secondary transfer position. Registration roller 324 conveys the sheet to the second transfer position in according with a timing at which the toner or ink image on intermediate transfer belt 327 is transferred. As a result, the color image is transferred onto the sheet.

Transfer section 328 supplies the sheet onto which the toner or ink image is transferred to a fixing device 329. Fixing device 329 fixes the toner or ink image on the sheet. Fixing device 329 has a heating section 329a, a heat roller 329b, and a pressure roller 329c. Heating section 329a heats heat roller 329b. Heat roller 329b and pressure roller 329c perform a fixing processing of heating and pressurizing the sheet onto which the toner or ink image is transferred by transfer section 328. Heat roller 329b and pressure roller 329c of fixing device 329 transmit the sheet on which the fixing processing is performed to conveyance roller 323d. Conveyance roller 323d conveys the sheet from fixing device 329 to a sheet discharge section 330.

As illustrated in FIG. 2, operation panel 204 is a user interface. Operation panel 204 displays guidance and receives an input of an operation button or icon. For example, a user inputs setting information with operation panel 204. Operation panel 204 includes a display section, or display, 241, a touch panel 242, and a plurality of operation buttons 243. For example, touch panel 242 is provided on a display screen of display section 241. Touch panel 242 detects a portion touched by user 116 on the display screen of display section 241.

The disclosed embodiments may avoid the actions taken with regards to operations panel 204 by using contactless input device 1061. Instead of pushing buttons 243 or touching touch panel 242, the disclosed embodiments may obtain user identification 118 using contactless input device 1061. For example, a card 250 may be provided by user 116. Alternatively, card 250 may be a card attached to a lanyard normally carried by employees or people within an organization or location. Card 250 may be placed into contactless input device 1061 to provide information on user 116. Such information may be a user name 252, as shown on card 250. Contactless input device 1061 may associate user name 252 with user identification 118. Information associated with user 116 may be read by contactless input device 1061 from embedded chip 254 within card 250. It also may be read from graphical code 256. Graphical code 256 may be scanned by input device 1061 and may include a barcode, a QR code, and the like. In this way, user identification 118 is provided to MFP 106 without the need to make contact with any component, buttons, or screen thereon.

In some embodiments, facsimile device 112 is incorporated within MFP 106. The embodiments disclosed in FIGS. 1B and 1C may be implemented with printing component 108 and scanning component 110. For example, if facsimile device 112 is instructed to print out print document 127, then printing component 108 may be used as disclosed above.

Figure 4A:
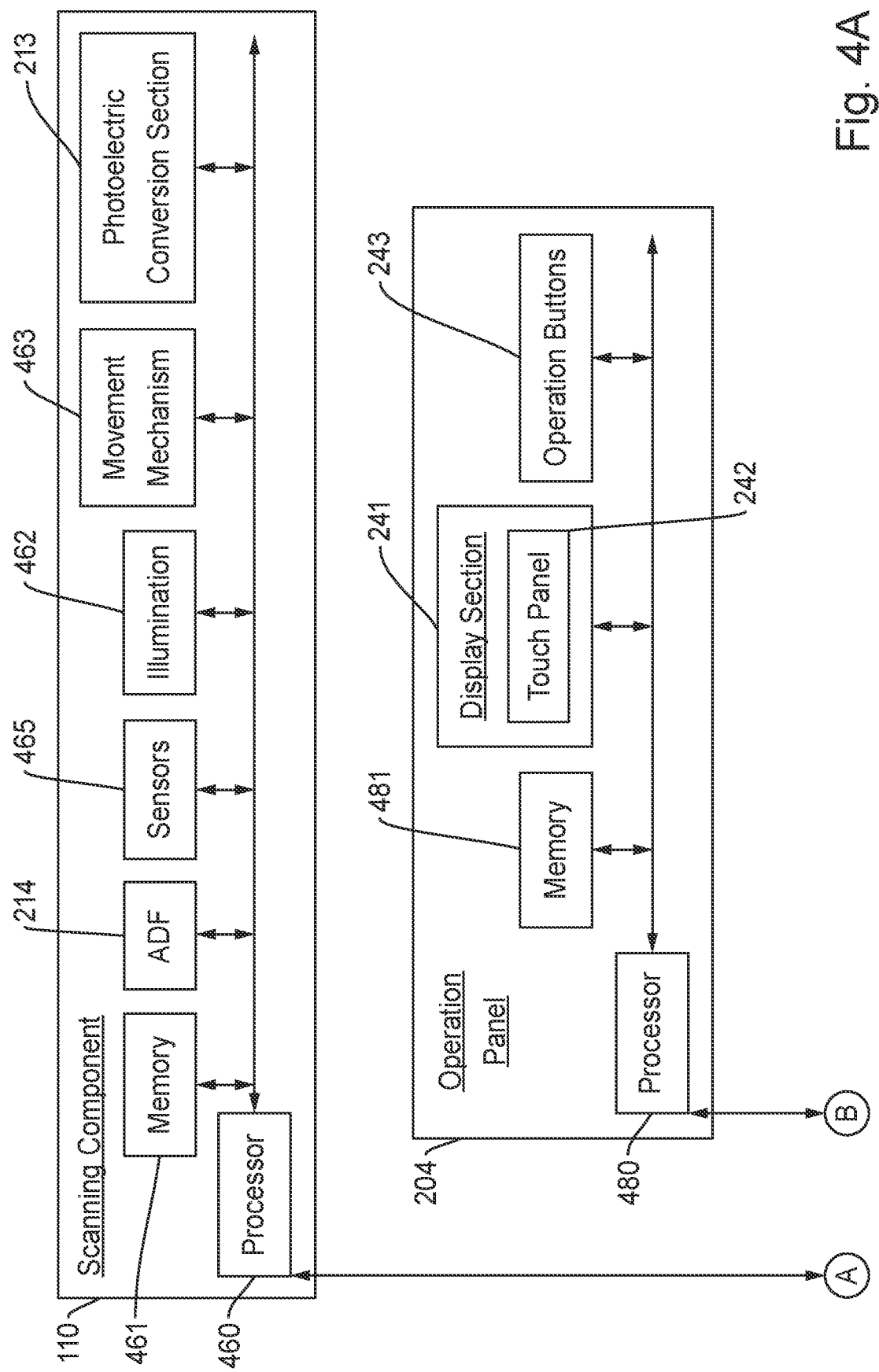
FIG. 4A illustrates a block diagram of an example control system for the MFP according to the disclosed embodiments.

FIGS. 4A and 4B depict a block diagram of an example control system for MFP 106 according to the disclosed embodiments. MFP 106 includes a system controller 405 that may control printing component 108, scanning component 110, and other components on the MFP. System controller 405 is connected to scanning component 110, printing component 108, and operation panel 204. As shown in FIGS. 4A and 4B, system controller 405 includes a processor 450, a memory 451, an image memory 452, an image processing section 453, a storage device 454, and a communication interface (I/F) 455.

Processor 450 is connected to processor 460 of scanning component 110, processor 470 of printing component 108, and processor 480 of operation panel 204 via applicable interfaces. Processor 450 may perform various processing functions by executing programs stored in memory 451 or storage device 454. For example, by executing a program stored in memory 451, processor 450 output an operation instruction to each section and processes various kinds of information from each section.

Memory 451 includes memories such as a random access memory (RAM), a read only memory (ROM), a non-volatile memory (NVM), and the like. The RAM functions as a working memory or a buffer memory. The ROM is a non-rewritable nonvolatile memory. The ROM functions at a program memory. The NVM is a rewriteable nonvolatile memory. The NVM stores setting data for scanning component 110 and printing component 108, and the like.

Memory 451 may include storage area 451a and storage area 451b. Storage area 451a and storage area 451b are rewritable nonvolatile memory areas. Storage area 451a stores information indicating a size of a sheet used for image adjustment in which a below-disclosed setting value to be stored is obtained. Storage area 451b stores sheet information used for correcting the setting value for the image adjustment.

Image memory 452 stores the image data. For example, image memory 452 functions as a page memory for copying or decompressing the image data to be processed. Image processing section 453 processes the image data. To output the processed image data, image processing section 453 performs image processing such as correction, compression, or decompression on the input image data to output the processed image data.

Storage device 454 stores control data, control programs, and data such as setting information. Storage device 454 is a rewritable nonvolatile memory. For example, storage device 454 may be a hard disk drive (HDD) or a solid state drive (SSD).

Communication I/F 455 is used for establishing data communication with an external device. For example, communication I/F 455 functions as an image acquisition section that acquires an image to be printed on the sheet from an external device such as a personal computer (PC). Communication I/F 455 also functions as an interface for communicating with a server, such as cloud based server 102.

An example of a configuration of a control system in scanning component 110 may be disclosed below. Scanning component 110 includes processor 460, memory 461, ADF 214, illumination 462, movement mechanism 463, and photoelectric conversion section 213. Processor 460 performs various kinds of processing by executing programs stored in memory 461. For example, by executing a program, processor 460 controls the operation of each section of scanning component 110, and monitors an operation state of each section. Processor 460 is connected to processor 450 of system controller 405. Processor 460 executes scanning processing in response to an operation instruction from system controller 405.

Memory 461 includes a RAM, a ROM, a data memory, and the like. The RAM functions as a working memory or a buffer memory. The ROM is a non-rewritable nonvolatile memory. The ROM functions as a program memory. The data memory is a rewritable nonvolatile memory.

ADF 214 has a pickup roller and a conveyance system 302 as a configuration of a control system. Processor 460 drives the pickup roller and conveyance system 302 to convey the documents one by one to the reading position. ADF 214 also may include sensors 465 located on sheet feed tray 301 to detect the presence of a document or sheets. Sensors 465 also may be located on or adjacent platen glass 211 to detect when a document or sheet is placed thereon. Sensors 465 may alert scanning component 110 that documents need to be scanned.

Illumination 462 is provided in carriage 212 to irradiate the reading position on platen glass 211 with light. Illumination 462 has a light source that emits light in response to a lighting instruction from processor 460. The light source is not limited to having a specific configuration. The light emitted by illumination 462 is reflected by the document placed on platen glass 211 and then enters photoelectric conversion section 213 via the optical system such as a mirror, a lens, and the like.

Movement mechanism 463 moves carriage 212. Movement mechanism 463 includes a stepping motor as a driving source and moves carriage 212 according to the driving of the stepping motor. Movement mechanism 463 moves carriage 212 in response to operation instructions from processor 460 or processor 450 of system controller 405. For example, at the time of scanning the document on platen glass 211, processor 460 moves carriage 212 from a reading start position in the sub-scanning direction (FWD direction).

Photoelectric conversion section 213 includes a photoelectric conversion sensor including photoelectric conversion elements for converting incident light into an electrical signal. Photoelectric conversion section 213 includes, for example, a photoelectric conversion sensor, which is a line sensor for generating pixel data corresponding to one line read in the main scanning direction. Photoelectric conversion section 213 also has a lens for inputting the light guided by the optical system provided in carriage 212 to the photoelectric conversion sensor. Specifically, the photoelectric conversion section 213 sequentially outputs the pixel data corresponding to each line read in the main scanning direction as carriage 212 moves in the sub-scanning direction.

An example of a configuration of a control system for printing component 108 is disclosed. Printing component 108 includes processor 470, memory 471, conveyance system 323, image forming section 325, exposure device 326, transfer section 328, and fixing device 329. Processor 470 performs various kinds of processing by executing programs stored in memory 471. For example, by executing a program, processor 470 controls the operation of each section of printing component 108 and monitors an operation state of each section. Processor 470 is connected to processor 450 of system controller 405 via the interface. Processor 470 executes a printing processing in response to an operation instruction from system controller 405.

Memory 471 includes memories such as a RAM, a ROM, a data memory, and the like. The RAM functions as a working memory or a buffer memory. The ROM is a non-rewritable nonvolatile memory. The ROM functions as a program memory. The data memory is a rewritable nonvolatile memory.

Conveyance system 323 conveys the sheet in printing component 108 under the control of processor 470. Specifically, conveyance system 323 drives conveyance rollers of the respective sections in response to an operation instruction from processor 470 to convey the sheet.

In response to the operation instruction from processor 470, exposure device 326 emits light, such as a laser light, for forming an electrostatic latent image on the photoconductive drum of each image forming section 325. Processor 470 adjusts a printing position and a magnification by controlling the irradiation position of the laser light on the photoconductive drum by exposure device 326. Processor 470 executes image adjustment such that a printing area becomes a desired printing area by performing operation control according to a printing area starting from a printing reference.

Image forming section 325 develops the electrostatic latent images formed on the photoconductive drums with toners or inks of respective colors in response to operation instructions from processor 470. Image forming section 325 transfers the toner or ink image formed on the photoconductive drum onto intermediate transfer belt 327, or the primary transfer. Transfer section 328 transfers the toner or ink image transferred onto intermediate transfer belt 327 onto the sheet, or the secondary transfer, in response to an operation instruction from processor 470.

Fixing device 329 drives heat roller 329*b* and pressure roller 329*c* in response to an operation instruction from processor 470. Heating section 329*a* of fixing device 329 heats the surface temperature of heat roller 329*b* to a desired fixing temperature under the control of processor 470. In a state in which fixing device 329 is controlled at the fixing temperature, fixing device 329 fixes the toner or ink image transferred onto the sheet.

An example of configuration of a control system for operation panel 204 is disclosed. Operation panel 204 includes a processor 480, memory 481, display section 241, touch panel 242, and operation buttons 243. Processor 480 performs various kinds of processing by executing programs stored in memory 481. For example, processor 480 executes a program to control the operation of each section of operation panel 204 and to monitor an operation state of each section. Processor 480 is connected to processor 450 of system controller 405. For example, processor 480 provides system controller 405 with information input by user 116, or read by contactless input device 1061.

Memory 481 includes memories such as a RAM, a ROM, a data memory, and the like. The RAM functions as a working memory or a buffer memory. The ROM is a non-rewritable nonvolatile memory. The ROM functions as a program memory. The data memory is a rewritable nonvolatile memory.

Display contents of display section 241 are controlled in response to an operation instructions from processor 480. Touch panel 242 is provided on the display screen of display section 241 to detect a touched position on the display screen. For example, processor 480 displays an operation guidance and icons capable of being selected with touch panel 242 on the display screen of display section 241. Processor 480 determines information input by user 116 according to the touched position detected by touch panel 242. Operation buttons 243 include hard keys such as a start key, a reset key, and the like.

According to the disclosed embodiments, printing component 108 and scanning component 110 may be operated without the need to use touch panel 242 or buttons 243. Instead, operations may be implemented by processors 460, 450, and 470 by policies 124 at cloud based server 102. In other words, the instructions implemented by the processors are fed to the various components from cloud based server 102 and does not require the need for user 116 to input any information or take any action beyond logging onto MFP 106.

Figure 5:
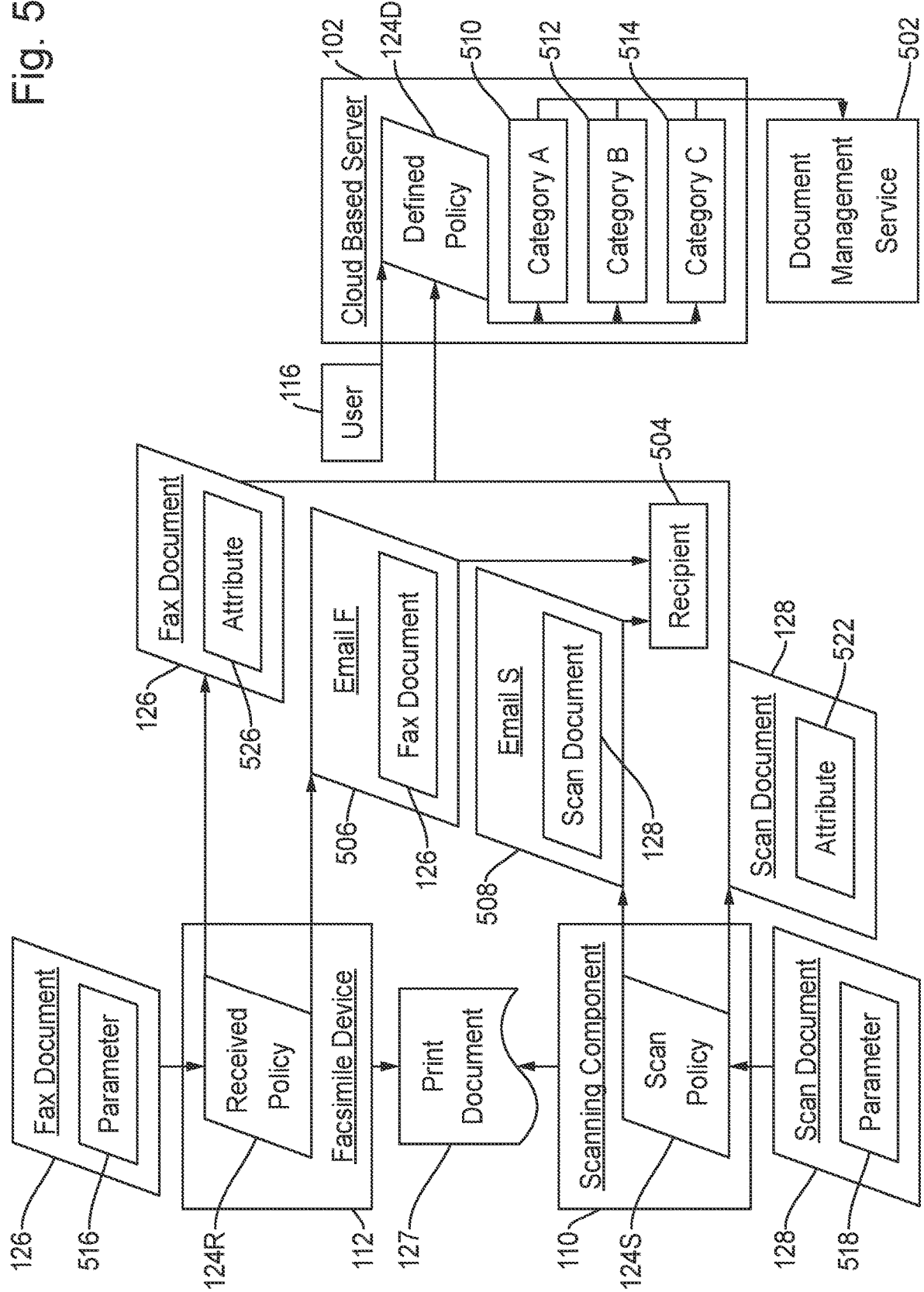
FIG. 5 illustrates a block diagram of management of a fax document or a scan document using a policy according to the disclosed embodiments.

FIG. 5 depicts a block diagram of management of fax document 126 or scan document 128 using a policy 124 according to the disclosed embodiments. Fax document 126 may be provided by facsimile device 112. Scan document 128 may be provided by scanning component 110 of MFP 106. The disclosed embodiments implement policies 124R, 124S, and 124D to manage these documents within system 100.

Referring to facsimile device 112, fax document 126 may be received from sender 140 via network 104 as illustrated in FIG. 1A. Sender 140 may scan and send fax document 126 as an image file over a telephone line as a signal, as disclosed above. Upon receipt at facsimile device 112, parameter 516 may be determined for fax document 126. Parameter 516 may be data or information pertaining to an aspect of fax document 126. For example, parameter 516 may be a telephone number of sender 140. It also may be an identification number related to fax document 126 or sender 140, such as an employee number. Further, parameter 516 may be an IP address of the device sending fax document 126. In other words, parameter 516 may include information that identifies a source for fax document 126.

Parameter 516 also may be a size for fax document 126. As fax document 126 is comprised of data, it should have a file size, such as 3 MB. This size may correspond to the amount of memory needed to store fax document 126 at facsimile device 112 or at cloud based server 102. Size information may be determined upon receipt at facsimile device 112, and not necessarily provided by, or pertaining to, sender 140.

Facsimile device 112 implements received policy 124R to manage fax document 126. Received policy 124R is downloaded from defined policy 124D at cloud based server 102. Facsimile device 112 may retrieve received policy 124R upon receipt of fax document 126. In some embodiments, facsimile device 112 queries cloud based server 102 to use defined policy 124D to determine how to manage fax document 126. User 116 may pre-configure, or define, defined policy 124D such that prefer options are implemented automatically by facsimile device 112 to manage received fax documents.

Policy 124R and policy 124D may define management of fax document 126 by parameter 516 according to data based on sender 140. For example, policy 124R may define that if fax document 126 includes parameter 516 indicating that it is from sender 140 having a number of 9258888888, then facsimile device 112 should forward fax document 126 to cloud based server 102 for further actions. Alternatively, it may be forwarded to a location within document management service 502, such as a website or URL address, like kcim.kyocera.com. User 116 may define any number of numbers to manage a received fax document this way.

Alternatively, policy 124R and policy 124D may define that if parameter 516 includes a number for sender 140 such as 9251111111, then fax document 126 is to be sent to recipient 504 as an attachment in email F 506. Fax documents from certain senders may warrant immediate attention from user 116 so they are not forwarded to cloud based server 102. Instead, they are attached to an email F 506 to be received and reviewed without further actions. Further, these fax documents may not be placed immediately on document management service 502 for viewing by others. For example, personal documents may be kept off document management service 502 by policy 124R and policy 124D.

For other numbers, policy 124R and policy 124D may not take further action within system 100 and prints out print document 127. These documents may be spam documents. Facsimile device 112 may query policy 124R and determine parameter 516 does not match any of the defined numbers or parameters in the policy. Alternatively, user 116 may define some numbers for parameter 516 to automatically print out at facsimile device 112. In some embodiments, fax document 126 may be sent to trash or discarded instead of printed out.

In other embodiments, parameter 516 may relate to the size of fax document 126. Large documents may be sent to cloud based server 102 or document management service 502. Small documents may be sent via email F 506. This feature may prevent large documents from cluttering email accounts and platforms by taking up large amounts of memory until the user can manage the emails. By diverting the large document to cloud based server 102, the disclosed embodiments can allocate memory resources more efficiently.

Received policy 124R or defined policy 124D may set forth the size criteria to use when determining whether to send the documents as an email attachment or to cloud based server 102. For example, policy 124R may specify for fax document 126 less than 5 MB, then the fax document is sent as an attachment to email F 506. Email F 506 may be sent to recipient 504. If fax document 126 is equal to or greater than 5 MB, then it is sent to cloud based server 102 or to document management service 502 via the cloud based server.

Instead of file size, the disclosed embodiments also may determine how to manage fax document 126 by the number of pages or sheets in the document. For example, policy 124R may specify that if fax document 126 is 2 pages or less, then it is sent as an attachment to email F 506. Email F 506 may be sent to a recipient 504 to receive fax document 126. If fax document 126 is greater than 2 pages, then it will be forwarded to cloud based server 102. Smaller documents with 2 or less pages may be made available to quickly address any issues within the document. Larger documents may be stored at cloud based server 102 or made available within document management service 102.

In other embodiments, policies may be used to categorize fax document 126 for use within document management service 502. The disclosed embodiments may categorize fax document 126 into categories within document management service 502 for later retrieval by user 116 or another entity with access to the document management service. As these action, preferably, are taken at cloud based server 102, defined policy 124D will be discussed. It should be understood that the same actions may be taken at facsimile device 112 or scanning component 110 using received policy 124R and scan policy 124S, respectively.

For example, cloud based server 102 may sort documents into a plurality of categories available to document management service 502. Category A 510, category B 512, and category C 514 are shown. Additional categories may be implemented by cloud based server 102. Categories may be separated by many different criteria. For example, the categories may be separated by the sender's information so that fax documents 126 received by a certain sender is available to document management service 502. Category A 510 may correspond to a sender 140 having a phone number of 9258888888. Category B 512 may correspond to a sender 140 having a phone number of 9257777777. Category C 514 may correspond to a sender 140 having a phone number of 9259999999. Documents are sorted by the respective phone number of the sender of fax document 126.

Alternatively, the categories may be separated by date. For example, category A 510 may correspond to fax documents 126 received on the date of Nov. 15, 2021. Category B 512 may correspond to fax documents 126 received on the date of Nov. 16, 2021. Category C 514 may correspond to fax documents 126 received on the date of Nov. 17, 2021. Alternatively, the categories may relate to different weeks on which fax documents 126 are received. This feature may allow user 116 to configure policy 124D to categorize as he/she would like to review the received documents.

In some embodiments, fax documents 126 may be categorized into work groups automatically. User 116 may belong to different work groups defined within document management service 502. The received fax documents include a header or other information to signify the work group to which they belong. Thus, users 116 may access fax documents pertaining to their applicable work groups. For those documents not applicable to work group, these may be marked as spam and separated from the other documents.

Categorization by cloud based server 102 occurs according to attribute 526 of fax document 126 received from facsimile device 112. Received policy 124R may determine that fax document 126 is to be sent to cloud based server 102 for categorization. Defined policy 124D may then categorize the received fax document to one or more categories. Attribute 526 may be any data or information not part of the actual document itself, such as a number for sender 140, date of receipt, employee number for the recipient, and the like. Cloud based server 102 may review attribute 526 to see if it fits within any of the defined categories. If so, then cloud based server 102 places fax document 126 into that category. Cloud based server 102 then posts fax document 126 to the matching categories on document management service 502.

User 116 may pre-configure or define defined policy 124D to include the desired categories for fax documents 126. In fact, user 116 may define the actual categories to be implemented. Alternatively, administrator 130 may do so.

Scanning component 110 may provide similar services as facsimile device 112, except that scan document 128 is produced instead of fax document 126. Scan document 128 may be scanned by scanning component 110. Scan policy 124S may be used in the same manner as received policy 124R. Parameter 518 may be used to determine whether to send scan document 128 to cloud based server 102 or to send as an attachment to email S 508. Scanning component 110 may use the same criteria as received policy 124R for scan policy 124S. Scan policy 124S may differ on the values used for the criteria, such as the size of received fax document 126 versus scan document 128. Scanning component 110 may forward larger documents for management at cloud based server 102. If scan document 128 is not forwarded to cloud based server 102, then it may be printed out as print document 127, disclosed above.

Scan documents 128 sent to cloud based server 102 also may be categorized to one of category A 510, category B 512, and category C 514. User 116 may scan documents and have them automatically assigned to a category using defined policy 124D. After categorization, scan document 128 may be made available on document management service 502 based on the assigned category. Attribute 522 may be used to determine where to categorize scan document 128. All the categorization may be done automatically without the need for the user to touch the appropriate machine.

FIG. 6 depicts a flowchart 600 for managing fax document 126 or scan document 128 using a received policy 124R or defined policy 124D at facsimile device 112 or scanning component 110 according to the disclosed embodiments. Flowchart 600 may refer to FIGS. 1A-5 for illustrative purposes. Flowchart 600, however, is not limited to the embodiments disclosed by FIGS. 1A-5. Flowchart 600 may apply to either fax document 126 or scan document 128. The embodiments disclosed below may refer to fax document 126 for brevity but the same features also apply to managing scan document 128.

Step 602 executes by receiving fax document 126 at facsimile device 112 or scanning scan document 128 at scanning component 110. Sender 140 may send fax document 126. A number for sender 140 may be included as parameter 516. For scan document 128, scanning component 110 may scan or capture an image of scan document 128. Sender 140 in this instance may also be user 116 and includes an identification number shown as parameter 518. Step 604 executes by determining the applicable parameter for fax document 126. As noted above, parameter 516 may relate to a sender or user. Parameter 516 also may be data or information about fax document 126 itself, such as a data size, a number of pages, a number of impressions, and the like. Scan document 128 also may include parameter 518 having the same features.

Step 606 executes by querying cloud based server 102 whether a policy exists that pertains to something related to fax document 126. For example, facsimile device 112 may query cloud based server 102 to determine whether a policy is applicable to the sender of the fax document. Alternatively, the query may determine whether a policy exists for user 116, who is receiving fax document 126. The policy should provide criteria in order to manage fax document 126 at facsimile device 112. There also should be some aspect of the applicable policy to link it to fax document 126. Preferably, this aspect is the identity of the sender but may be other factors as well.

Step 608 executes by determining whether a defined policy 124D is applicable to fax document 126. Sender 140 may be used to identify defined policy 124D. If step 608 is no, then step 610 executes by printing fax document 126 as print document 127 at facsimile device 112. For scan document 128, the same analysis may be done and printing component 108 used to print out print document 127. No policy is provided to facsimile device 112 or scanning component 110.

If step 608 is yes, then step 611 executes by forwarding defined policy 124D to facsimile device 112, where it is used as received policy 124R. For scanning component 110, it may receive defined policy 124D and use it as scan policy 124S. Thus, a policy may be kept at cloud based server 102 to be managed and modified as needed by user 116 or administrator 130. Defined policy 124D may be sent as requested so that facsimile device 112 or scanning component 110 receives the most up to date version of the policy to be used. In other embodiments, defined policy 124D is not sent to any device or component, but retained at cloud based server 102, which applies the policy as disclosed below.

Step 612 executes by applying received policy 124R to parameter 516 of fax document 126 or parameter 518 of scan document 128. As disclosed above, the parameter may relate to a number or identification about sender 140, user 116, or recipient 504. Alternatively, the parameter may relate to the size of the received document, or the number of pages or impressions for the document. Preferably, the parameter is used to determine whether a certain action should be taken. If not, then another action is taken instead.

Step 614 executes by determining the action to be taken based on parameter 516 of fax document 126 or parameter 518 of scan document 128. For example, received policy 124R specifies that if parameter 516 is above 5 MB, then facsimile device 112 forwards fax document 126 to cloud based server 102. Otherwise, it is sent via email F 506 as an attachment to recipient 504, which may be an account for user 116. Step 614 determines which action is to be taken according to received policy 124R. Scanning component 110 may do the same action based on scan policy 124S for scan document 128.

Step 616 executes by performing the action to be taken, as specified above. Fax document 126 is either sent to cloud based server 102 or sent as an attachment to email F 506. Another alternative is to print out print document 127 instead, or simply delete fax document 126 from system 100. For scan document 128, it is either forwarded to cloud based server 102 or sent as an attachment to email S 508. Thus, defined policy 124D is implemented at the device level to manage documents automatically.

FIG. 7 depicts a flowchart 700 for managing documents within system 100 by placing them into categories at cloud based server 102 for use within document management service 502 according to the disclosed embodiments. Flowchart 700 may refer to FIGS. 1A-6 for illustrative purposes. Flowchart 700, however, is not limited to the embodiments disclosed by FIGS. 1A-6.

Step 702 executes by receiving fax document 126 at facsimile device 112 or scan document 128 at scanning component 110. This step is similar to step 602 disclosed above. Step 704 executes by forwarding fax document 126 or scan document 128 to cloud based server 102. Flowchart 700 may incorporate steps 604-616 disclosed above to determine whether the document should be sent to cloud based server 102. For example, the disclosed embodiments may not want to categorize small documents that probably are spam or not related to anything important within system 100.

Step 706 executes by querying cloud based server 102 for defined policy 124D that corresponds to fax document 126 or scan document 128. Alternatively, all received documents are categorized using defined policy 124D. Step 708 executes by determining attribute 526 for fax document 126 or attribute 522 for scan document 128. An attribute may be data or information pertaining to the document itself, such as the origin of the document or the date received. Preferably, the attribute may be added at the receiving device or component. Further, documents may have one or more attributes.

Step 710 executes by categorizing fax document 126 using attribute 526 or scan document 128 using attribute 522. Defined policy 124D may set forth the different categories applicable to the received document. The disclosed embodiments may categorize the received document into more than one category as long as an attribute is identified. For example, attribute 522 actually may be a plurality of attributes, such as sender identification, date of receipt, group name, facsimile device information, size of the document, and the like. Policy 124D may specify into which categories to place fax document 126. Step 712 executes by placing fax document 126 into one or more applicable categories according to attribute 526. Referring to FIG. 5, fax document 126 may be placed in category A 510, category B 512, and category C 514. Alternatively, scan document 128 may be placed in category A 510, category B 512, and category C 514.

Step 714 executes by making fax document 126 or scan document 128 available on document management service 502 in the assigned categories. Document management service 502 may use system 100 to allow access to documents via a cloud based platform. Documents may be placed in categories for access. For example, fax document 126 is available on document management service 502 for category A 510, category B 512, and category C 514. User 116 may access documents in category B 512 and find fax document 126 therein. User 116 does not need to manually place fax document 126 into the category. Cloud based server 102 automatically does so using defined policy 124D. Step 716 executes by updating information within document management service 502 about the categorization of fax document 126 or scan document 128.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing facsimile documents, the method comprising:
    receiving a facsimile document from a sender at a multi-functional peripheral (MFP) device, wherein the facsimile document includes a parameter;
    querying a cloud based server of a document management service for a policy related to the sender of the facsimile document;
    determining whether an action is to be taken by the MFP device based on the parameter of the facsimile document and the policy, wherein the policy defines criteria for the parameter; and
    performing the action at the MFP device to forward the facsimile document within the document management service based on whether the parameter meets the criteria,
    wherein the action includes forwarding the facsimile document to the cloud based server if the parameter meets the criteria, and
    wherein the action includes attaching the facsimile document to an email if the parameter does not meet the criteria.

2. The method of claim 1, wherein the parameter is an identification number.

3. The method of claim 2, wherein the identification number is a telephone number.

4. The method of claim 2, wherein the identification number is an employee number.

5. The method of claim 1, wherein the parameter is a document size for the facsimile document.

6. The method of claim 1, wherein the action to be taken includes printing the facsimile document at the MFP device if no criteria is defined for the parameter in the policy.

7. The method of claim 1, further comprising configuring the policy at the cloud based server.

8. The method of claim 1, wherein determining the action to be taken includes determining that the policy is not available at the cloud based server.

9. A document management system configured to
receive a facsimile document from a sender at a multi-functional peripheral (MFP) device, wherein the facsimile document includes a parameter;
query a cloud based server of a document management service for a policy related to the sender of the facsimile document;
determine whether an action is to be taken by the MFP device based on the parameter of the facsimile document and the policy, wherein the policy defines criteria for the parameter; and
perform the action at the MFP device to forward the facsimile document within the document management service based on whether the parameter meets the criteria,
wherein the action includes forwarding the facsimile document to the cloud based server if the parameter meets the criteria, and
wherein the action includes attaching the facsimile document to an email if the parameter does not meet the criteria.

10. The document management system of claim 9, wherein the parameter is an identification number.

11. The document management system of claim 10, wherein the identification number is a telephone number.

12. The document management system of claim 10, wherein the identification number is an employee number.

13. The document management system of claim 9, wherein the parameter is a document size for the facsimile document.

14. The document management system of claim 9, wherein the action to be taken includes to print the facsimile document at the MFP device if no criteria is defined for the parameter in the policy.

15. A non-transitory computer-readable medium having stored thereon processor-executable instructions for managing facsimile documents comprising:
receiving a facsimile document from a sender at a multi-functional peripheral (MFP) device, wherein the facsimile document includes a parameter;
querying a cloud based server of a document management service for a policy related to the sender of the facsimile document;
determining whether an action is to be taken by the MFP device based on the parameter of the facsimile document and the policy, wherein the policy defines criteria for the parameter; and
performing the action at the MFP device to forward the facsimile document within the document management service based on whether the parameter meets the criteria,
wherein the action includes forwarding the facsimile document to the cloud based server if the parameter meets the criteria, and
wherein the action includes attaching the facsimile document to an email if the parameter does not meet the criteria.

16. The non-transitory computer-readable medium of claim 15, wherein the parameter is a document size.

17. The non-transitory computer-readable medium of claim 15, wherein the action to be taken includes printing the facsimile document at the MFP device if no criteria is defined for the parameter in the policy.

* * * * *